US010146984B2

(12) United States Patent
Lee et al.

(10) Patent No.: US 10,146,984 B2
(45) Date of Patent: *Dec. 4, 2018

(54) MOBILE DEVICE WITH HIGH-ACCURACY FINGERPRINT IDENTIFICATION

(71) Applicant: SuperC-Touch Corporation, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 588 days.

This patent is subject to a terminal disclaimer.

(21) Appl. No.: 14/832,578

(22) Filed: Aug. 21, 2015

(65) Prior Publication Data

US 2016/0055363 A1 Feb. 25, 2016

(30) Foreign Application Priority Data

Aug. 25, 2014 (TW) ............................. 103215145 U

(51) Int. Cl.
*G06K 9/00* (2006.01)
*G06F 3/044* (2006.01)
*G06F 3/041* (2006.01)

(52) U.S. Cl.
CPC .......... *G06K 9/0002* (2013.01); *G06F 3/044* (2013.01); *G06F 3/0416* (2013.01); *G06F 2203/04103* (2013.01)

(58) Field of Classification Search
CPC ......... G06K 9/0002; G06K 2009/0006; G06K 9/00006
See application file for complete search history.

(56) References Cited

U.S. PATENT DOCUMENTS

| 8,704,539 | B2 | 4/2014 | Lee et al. | |
|---|---|---|---|---|
| 9,779,278 | B2* | 10/2017 | Nilsson | G06K 9/0002 |
| 2005/0030724 | A1* | 2/2005 | Ryhanen | A61B 5/117 361/760 |
| 2012/0105081 | A1* | 5/2012 | Shaikh | G06K 9/0002 324/686 |

(Continued)

*Primary Examiner* — Utpal D Shah
(74) *Attorney, Agent, or Firm* — Muncy, Geissler, Olds & Lowe, P.C.

(57) ABSTRACT

A mobile device with high-accuracy fingerprint identification includes a display panel, a transparent protection layer, and a fingerprint identification device. The transparent protection layer has one surface attached to the display panel. The fingerprint identification device is attached to the surface of the transparent protection layer for detecting a user fingerprint. The fingerprint identification device includes a flexible substrate, a fingerprint sensor, and a detector. The fingerprint sensor is disposed on the flexible substrate for sensing the user fingerprint to generate a fingerprint image. The detector is disposed on the flexible substrate and electrically connected to the fingerprint sensor for distinguishing a minute parasitic capacitance variation generated by the fingerprint sensor. A part of the flexible substrate arranged with the fingerprint sensor is closely attached to the transparent protection layer, and a part of the flexible substrate arranged with the detector is separately attached to the transparent protection layer.

10 Claims, 11 Drawing Sheets

(56) References Cited

U.S. PATENT DOCUMENTS

| | | | |
|---|---|---|---|
| 2015/0029135 A1* | 1/2015 | Han | G06F 3/0412 345/174 |
| 2015/0082890 A1* | 3/2015 | Pant | G01N 29/265 73/618 |
| 2015/0269407 A1* | 9/2015 | Chou | G06K 9/00053 382/124 |
| 2015/0294135 A1* | 10/2015 | Kim | H01L 23/04 382/124 |
| 2016/0004899 A1* | 1/2016 | Pi | G06F 1/1626 345/173 |
| 2016/0026846 A1* | 1/2016 | Lin | G06K 9/0002 382/124 |

\* cited by examiner

MOBILE DEVICE WITH HIGH-ACCURACY FINGERPRINT IDENTIFICATION

BACKGROUND OF THE INVENTION

1. Field of the Invention

The present invention relates to a structure of fingerprint identification device and, more particularly, to a mobile device with high-accuracy fingerprint identification.

2. Description of Related Art

Biological feature sensing and comparing technologies have been maturely and widely applied in identifying and verifying the identity of a person. Typical biometric identification types include fingerprint, voiceprint, iris, retina identifications, and the like.

For consideration of safe, comfortable, and efficient identification, the fingerprint identification has become the most popular one. The fingerprint identification generally requires a scanning to input a fingerprint or a finger image of a user and store the unique features of the finger image and/or the fingerprint for being further compared with the fingerprint reference data built in a database so as to identify or verify the identity of a person.

The image input types of the fingerprint identification include optical scanning, thermal image sensing, capacitive sensing, and the like. The optical scanning type is difficult to be applied in a mobile electronic device due to its large volume, and the thermal image sensing type is not popular due to its poor accuracy and reliability. Thus, the capacitive sensing type gradually becomes the most important biometric identification technology for the mobile electronic devices.

FIG. 1 is a local cross-sectional view of a typical fingerprint sensing region, which illustrates a capacitive fingerprint identification sensor interacting with a fingerprint. As shown in FIG. 1, the fingerprint 130 has the ridges 140 located on sensing elements 110. Namely, the capacitive finger identification sensor has a plurality of sensing elements 110, and the fingerprint 130 presses on a nonconductive protection layer 120. In the prior art, the protection layer 120 has a thickness of about 50 µm to 100 µm, such that the sensing elements 110 can sense signals of the ridges 140 of the fingerprint 130.

However, when the protection layer 120 is made of glass and has a thickness of about 50 µm to 100 µm, it may be broken due to an inappropriate press force of the finger. FIG. 2 is another local cross-sectional view of the typical fingerprint sensing region, in which the thickness of the protection layer 120 is increased to be 200 µm to 300 µm. In FIG. 2, dimensional relationships among individual elements are illustrated only for ease of understanding, but not to limit the actual scale. When the thickness of the protection layer 120 is getting increased, the distance d1 between the ridge 140 and the sensing element 110-1 is getting close to the distance d2 between the ridge 140 and the sensing element 110-2, i.e., d1≈d2, and thus the signals sensed by the sensing elements 110-1 and 110-2 are alike, resulting in that the fingerprint cannot be sensed accurately. Thus, the prior art encounters a tradeoff problem; i.e., the layer 120 may be easily broken when the thickness is decreased, and the fingerprint sensing cannot be performed accurately if thickness of the layer 120 is increased.

Accordingly, a direct approach to solve the problem is to adopt a sapphire as a material of the protection layer 120, so as to prevent the protection layer 120 from being broken due to an inappropriate force applied thereon. However, such a way relatively increases the cost.

Therefore, it is desirable to provide an improved mobile device with fingerprint identification to mitigate and/or obviate the aforementioned problems.

SUMMARY OF THE INVENTION

The object of the present invention is to provide a mobile device with high-accuracy fingerprint identification, which can sense a very small signal change with the increased thickness of the protection layer, so as to avoid using the expensive sapphire as the material of the protection layer, thereby reducing the manufacturing cost. In addition, the size of the sensing electrodes can be reduced, and the sensing resolution can be increased.

To achieve the object, there is provided a mobile device with high-accuracy fingerprint identification, which comprises: a display panel for displaying information associated with the mobile device; a protection layer having one surface attached to the display panel for protecting the display panel; and a fingerprint identification device attached to the surface of the transparent protection layer for detecting a user fingerprint, the fingerprint identification device including: a flexible substrate; a fingerprint sensor disposed on one surface of the flexible substrate for sensing the user fingerprint so as to generate a fingerprint image; and a detector disposed on the surface of the flexible substrate and electrically connected to the fingerprint sensor for distinguishing a minute parasitic capacitance variation generated by the fingerprint sensor, wherein a part of the flexible substrate arranged with the fingerprint sensor is closely attached to the transparent protection layer, and a part of the flexible substrate arranged with the detector is separately attached to the transparent protection layer.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
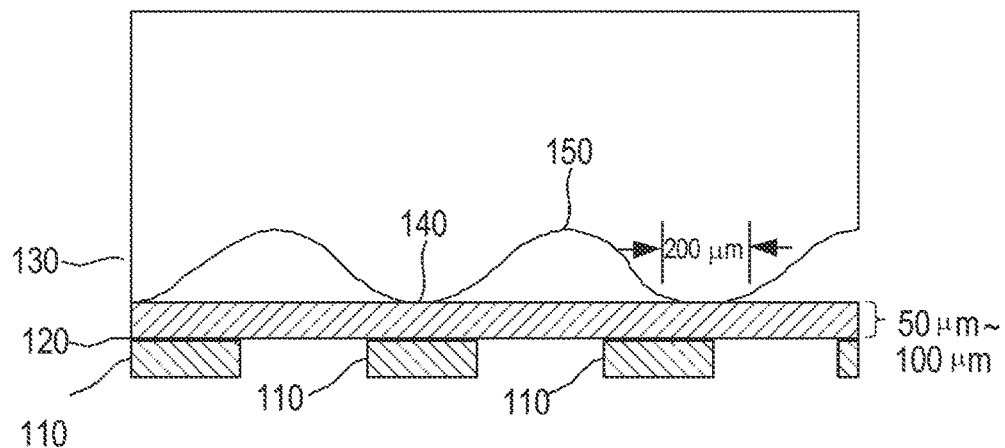
FIG. 1 is a local cross-sectional view of a typical fingerprint sensing region.
Figure 2:
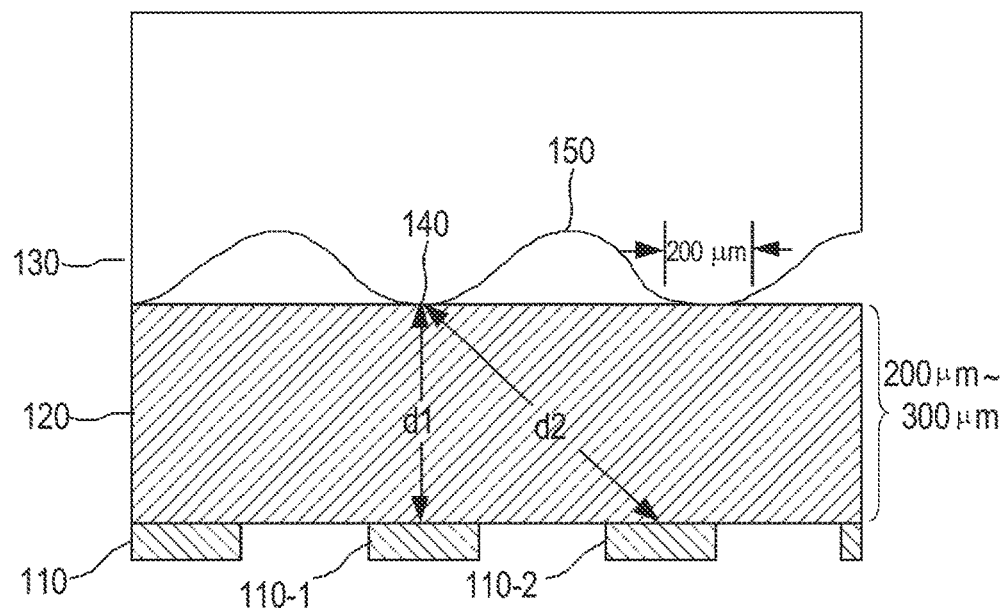
FIG. 2 is another local cross-sectional view of a typical fingerprint sensing region.
Figure 3:
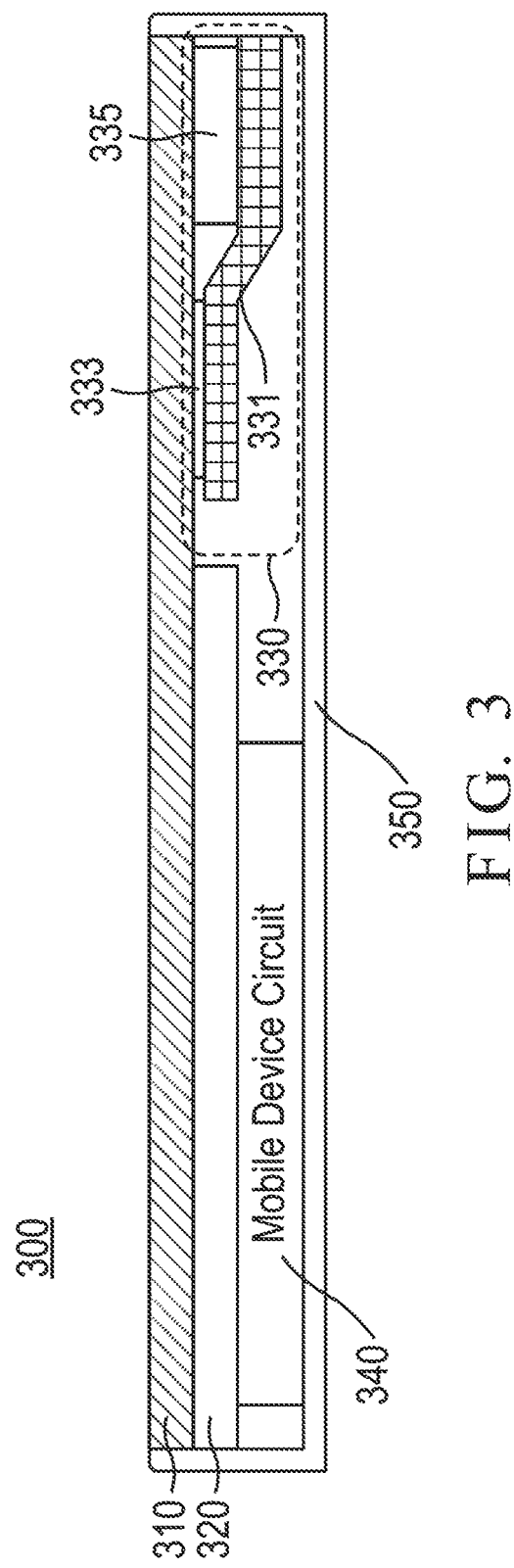
FIG. 3 is a schematic diagram of a mobile device with high-accuracy fingerprint identification according to an embodiment of the present invention.

FIG. 3 is a schematic diagram of a mobile device 300 with high-accuracy fingerprint identification according to an embodiment of the present invention. The mobile device 300 includes a transparent protection layer 310, a display panel 320, a fingerprint identification device 330, a mobile device circuit 340, and a housing 350. The mobile device circuit 340 is such a circuit for controlling the functional operation of the mobile device 300, and includes circuit boards, ICs, and electronic components. The housing 350 is provided for containing the transparent protection layer 310, the display panel 320, the fingerprint identification device 330, and the mobile device circuit 340, and allows the display panel 320 and the fingerprint identification device 330 to be presented to a user through the transparent protection layer 310, so that the user can view the information of the mobile device 300 and thus operate the mobile device 300.

The display panel 320 displays the information associated with the mobile device 300. The transparent protection layer 310 has one surface attached to the display panel 320 for protection. The transparent protection layer 310 is preferably a protective glass.

The fingerprint identification device 330 is attached to the surface of the transparent protection layer 310 for detecting the finger print of a user. The fingerprint identification device 330 includes a flexible substrate 331, a fingerprint sensor 333, and a detector 335.

The flexible substrate 331 is preferably made of a polymer thin film. The fingerprint sensor 333 is located on one surface of the flexible substrate 331 and attached to the transparent protection layer 310 for sensing the user fingerprint so as to generate a fingerprint image. The detector 335 is located on the surface of the flexible substrate 331, attached to the transparent protection layer 310, and electrically connected to the fingerprint sensor 333 for identifying a minute parasitic capacitance change generated by the fingerprint sensor 331, wherein the detector 335 is a minute impedance variation detection device.

The part of the flexible substrate 331 arranged with the fingerprint sensor 333 is closely attached to the transparent protection layer 310, while the part of the flexible substrate 331 arranged with the detector 335 is separately attached to the transparent protection layer 310.

The present invention essentially overcomes the tradeoff problem in the prior art that the transparent layer may be easily broken when the thickness is decreased but the fingerprint sensing cannot be performed accurately if thickness of the transparent layer is increased, and avoids using sapphire as the material of the transparent protection layer so as to reduce the manufacturing cost. Therefore, in comparison with a sapphire transparent protection layer, as the thickness of the transparent protection layer in the present invention is increased, there is a need to have a detector capable of measuring a minute impedance variation and, in addition, another problem to be solved is the mutual interferences among the sensing elements.

Figure 4:
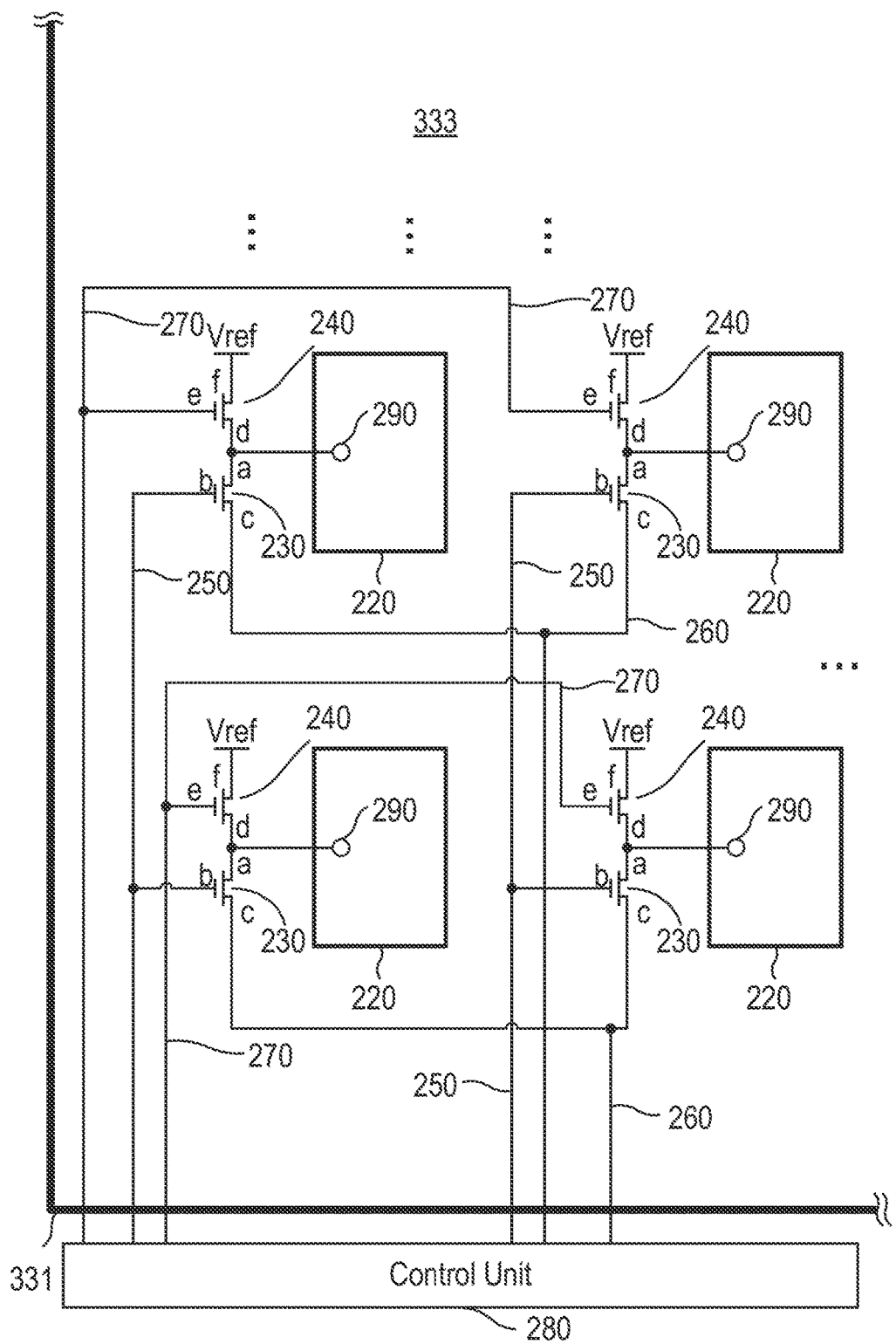
FIG. 4 is a schematic diagram of a fingerprint sensor according to an example of the present invention.

To overcome the mutual interferences among the sensing elements, the technique disclosed in U.S. application Ser. No. 14/819,156 entitled "Biometric identification device having sensing electrodes with multiple connection selections" filed on Aug. 5, 2015 by the applicant is used. FIG. 4 is a schematic diagram of the fingerprint sensor 333 according to the present invention. The fingerprint sensor 333 includes a plurality of sensing electrodes 220, a plurality of data readout selectors 230, a plurality of reference voltage selectors 240, a plurality of data readout select traces 250, a plurality of sensed signal readout lines 260, a plurality of reference voltage select traces 270, and a control unit 280.

The plurality of sensing electrodes 220 is disposed on one surface of the flexible substrate 331. Each of the sensing electrodes 220 can be a polygon, circle, ellipse, rectangle, or square. Each sensing electrode 220 is made of conductive metal material, which is selected from the group consisting of: chromium, barium, aluminum, silver, copper, titanium, nickel, tantalum, cobalt, tungsten, magnesium, calcium, potassium, lithium, indium, and alloy thereof.

Each of the data readout selectors 230 corresponds to one sensing electrode 220. Each data readout selector 230 has a first end (a), a second end (b), and a third end (c), wherein the first end (a) is connected to the corresponding sensing electrode 220. Each of the sensing electrodes 230 is a first thin film transistor (TFT) with a gate corresponding to the second end (b), a source/drain corresponding to the first end (a), and a drain/source corresponding to the third end (c).

In the example of FIG. 4, each sensing electrode 220 corresponds to one reference voltage selector 240. Each of the reference voltage selectors 240 has a first end (d), a second end (e), and a third end (f), wherein the first end (d) is connected to the corresponding sensing electrode 220. Each reference voltage selector 240 is a second TFT with a gate corresponding to the second end (e), a source/drain corresponding to the first end (d), and a drain/source corresponding to the third end (f).

Each of the data readout select traces 250 is connected to the second end (b) of at least one corresponding data readout selector 230. In the embodiment of FIG. 4, each data readout select trace 250 is connected to two data readout selectors 230.

Each of the sensed signal readout lines 260 is connected to the third end (c) of the at least one corresponding data readout selector 230. In the example of FIG. 4, each sensed signal readout line 260 is connected to the third ends (c) of two data readout selectors 230.

Each of the reference voltage select traces 270 is connected to the second end (e) of at least one corresponding reference voltage selector 240. In the example of FIG. 4, each reference voltage select trace 270 is connected to the second ends (e) of two reference voltage selectors 240.

The control unit 280 is connected to the data readout selectors 230 and the reference voltage selectors 240 through the data readout select traces 250, the sensed signal readout lines 260, and the reference voltage select traces 270, respectively, so as to read a sensed signal of the sensing electrode 220 corresponding to each data readout selector 230. The control unit 280 divides the plurality of sensing electrodes 220 into a sensing area and a non-sensing area by means of the plurality of data readout selectors 230 and the plurality of reference voltage selectors 240.

As shown in FIG. 4, the third ends (f) of the reference voltage selectors 240 are connected to a reference voltage Vref. In this example, the reference voltage Vref is preferably at 0V. Alternatively, the third ends (f) of the reference voltage selectors 240 can be connected to difference reference voltages Vref1, Vref2, . . . , Vrefn, respectively, where n is a natural number and the reference voltage can be a constant voltage at a specific level or a time-variable AC voltage signal.

Figure 5:
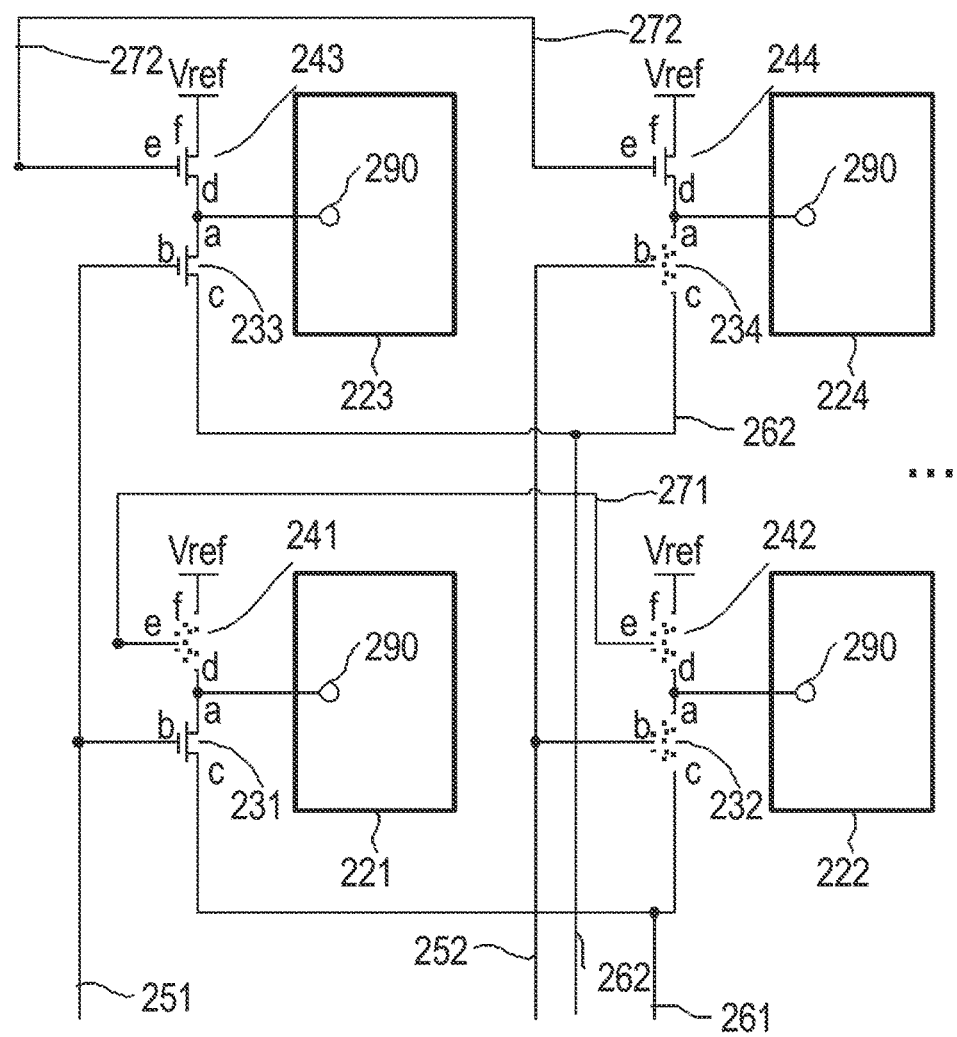
FIG. 5 schematically illustrates an operation of the fingerprint sensor of FIG. 4 according to the present invention.

FIG. 5 schematically illustrates an operation of the fingerprint sensor 333 of FIG. 4 according to the present invention, which shows how to accurately read the sensed signal on the sensing electrode 221. In FIG. 5, there are only four sensing electrodes 221, 222, 223, 224 given for illustrative purpose, but the present invention is not limited to it.

When performing a self-capacitance sensing, the control unit 280 drives the data readout select trace 251 to a high voltage and the data readout select trace 252 to a low voltage so as to turn on the data readout selectors 231, 233 and turn off the data readout selectors 232, 234, and simultaneously drives the reference voltage select trace 271 to a low voltage and the reference voltage select trace 272 to a high voltage so as to turn off the reference voltage selectors 241, 242 and turn on the reference voltage selectors 243, 244.

The control unit 280 can read the sensed signal on the sensing electrode 221 from the sensed signal readout line 261. Since the data readout selector 232 is turned off, the sensed signal on the sensing electrode 222 does not affect the sensed signal on the sensing electrode 221. At the same time, the reference voltage selectors 243, 244 are turned on, and the reference voltage Vref is at 0V, so that the sensing electrodes 223, 224 are also at 0V, which does not affect the sensed signal on the sensing electrode 221. In addition, since the data readout selectors 232, 234 are turned off, the sensed signal readout line 262 does not deliver the sensed signals on the sensing electrodes 222, 224, and thus the sensed signal readout line 262 also does not affect the sensed signal on the sensing electrode 221. Accordingly, the control unit 280 can accurately read the sensed signal on the sensing electrode 221.

Figure 6:
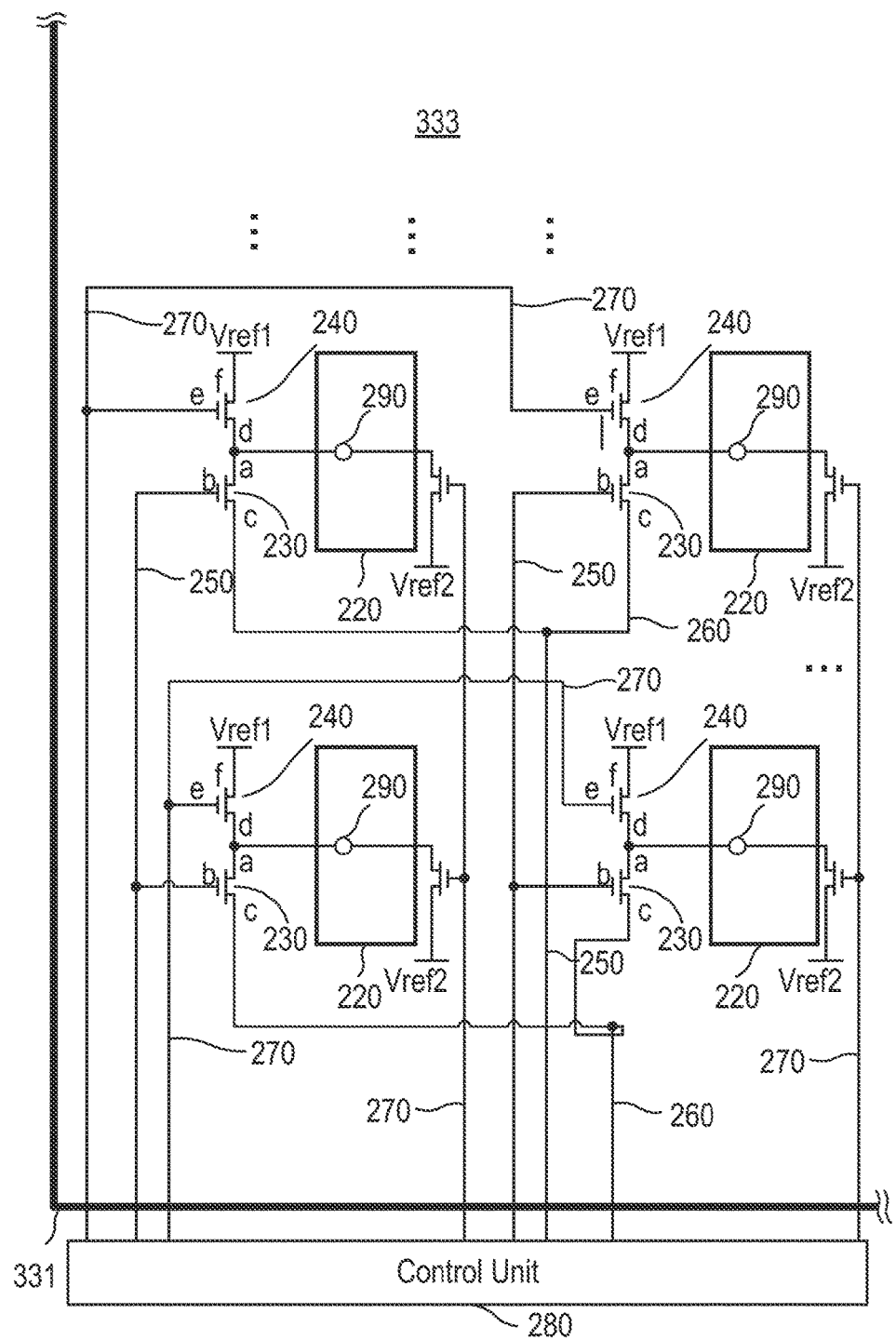
FIG. 6 is a schematic diagram of a fingerprint sensor according to another example of the present invention.

FIG. 6 is a schematic diagram of a fingerprint sensor 333 according to another example of the present invention, which is similar to that of FIG. 4 except that, in FIG. 6, each of the sensing electrodes 220 corresponds to two reference voltage selectors 240 connected to reference voltages Vref1, Vref2, respectively.

Figure 7:
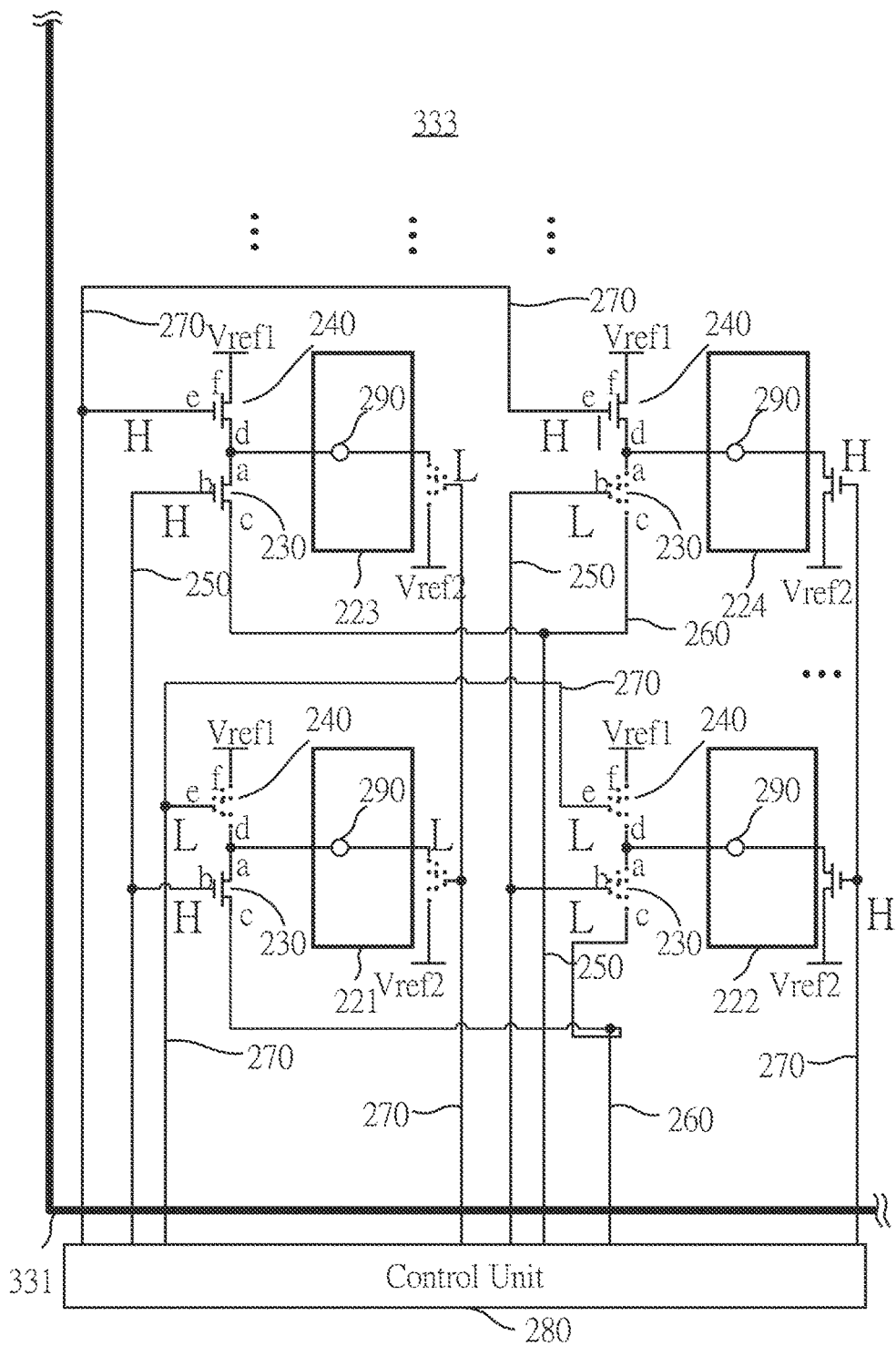
FIG. 7 schematically illustrates an operation of the fingerprint sensor of FIG. 6 according to the present invention.

FIG. 7 schematically illustrates an operation of the fingerprint sensor 333 of FIG. 6 according to the present invention. In FIG. 7, the reference voltages Vref1, Vref2 are preferably at 0V, wherein the symbol "H" indicates that the control unit 280 drives a trace at a high voltage to turn on the TFTs controlled by the trace, and "L" indicates that the control unit 280 drives the trace at a low voltage to turn off the TFTs controlled by the trace.

As shown in FIG. 7, the sensing electrodes 223, 224 are connected to the reference voltage Vref1 (0V), and thus the sensed signal on the sensing electrode 221 is not affected. The sensing electrode 222 is connected to the reference voltage Vref2 (0V), and thus the sensed signal on the sensing electrode 221 is also not affected. The electrodes 222, 223, 224 surrounding the sensing electrode 221 are grounded to provide a shielding effect to the sensing electrode 221 thereby eliminating the noise interference and the mutual interference among the sensing elements.

Figure 8:
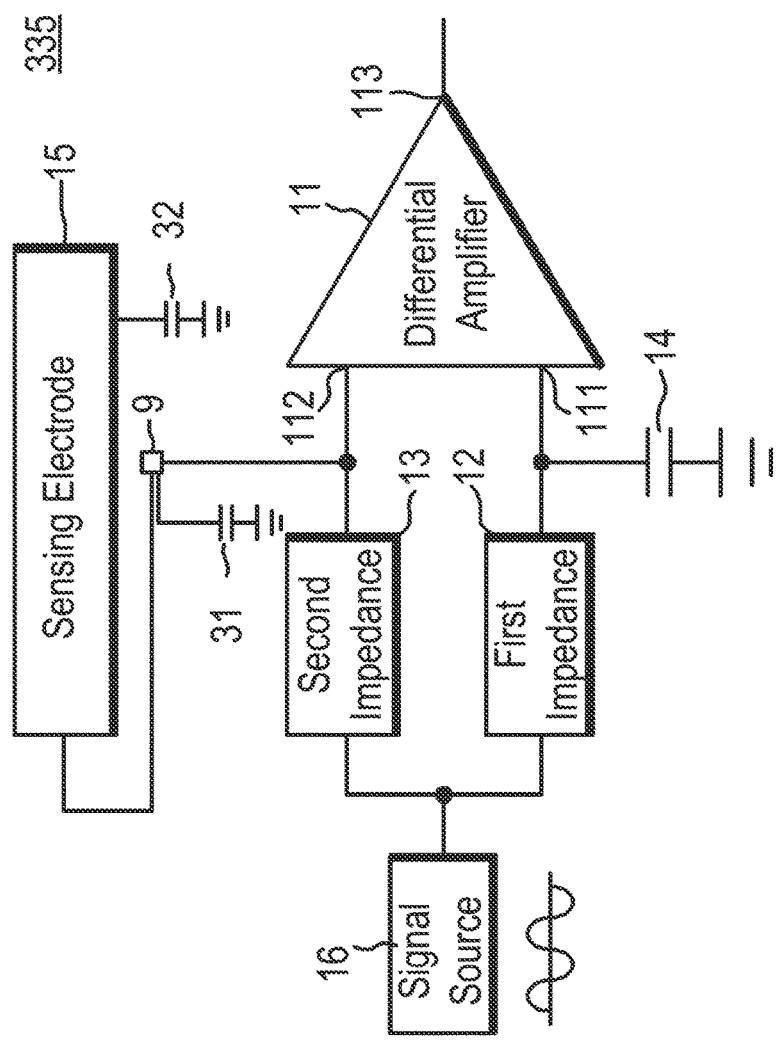
FIG. 8 is a system architecture of a detector according to an example of the present invention.

When the thickness of the transparent protection layer is increased, the technique disclosed in U.S. Pat. No. 8,704,539 granted to Lee, et al. for a "minute impedance variation detection device" is used. FIG. 8 is a system architecture of the detector 335 according to an example of the present invention. The detector 335 is a minute impedance variation detection device. As shown in FIG. 8, the detector 335 includes a differential amplifier 11, a first impedance 12, a second impedance 13, a first capacitor 14, a sensing electrode 15, and a signal source 16. The differential amplifier 11 includes a first input end 111, a second input end 112, and an output end 113. The first impedance 12 and the first capacitor 14 are electrically connected to the first input end 111, and the second impedance 13 and the sensing electrode 15 are electrically connected to the second input end 112. The signal source 16 is electrically connected to the first impedance 12 and the second impedance 13. The sensing electrode 15 is provided for sensing a touch and receiving a touch signal. In this example, the sensing electrode 15 is any of the sensing electrodes 220 of the fingerprint sensor 333 for detecting the user fingerprint and generating the fingerprint image. The signal source 16 provides an input signal for being inputted to the first impedance 12 and the second impedance 13. In this example, the signal source 16 provides a periodic signal for being inputted to the first impedance 12 and the second impedance 13.

In this example, the sensing electrode 15 is electrically connected to the second input end 112 through an integrated circuit pin 9. The integrated circuit pin 9 is provided with a first parasitic capacitance 31, and the sensing electrode 15 is also provided with a second parasitic capacitance 32. In the minute impedance variation detection device of the present invention, the impedance value of the first impedance 12 is close to, or even equal to, the impedance value of the second impedance 13. The differential amplifier 11 is based on the input signal and the touch signal to amplify differentially the touch signal and output the differentially amplified touch signal to the output end 113. Because the input signal is inputted in-between the first impedance 12 and the second impedance 13 with the same impedance value, the input signal is transmitted to the first input end 111 and the second input end 112 of the differential amplifier. When the impedance value of the first impedance 12 is close to, or even equal to, the impedance value of the second impedance 13, and the capacitance value of the first capacitor 14 is close to, or even equal to, the capacitance value of the first parasitic capacitance 31 and second parasitic capacitance 32 connected in parallel, the differentially amplified output signal (touch signal) is close to zero because the circuits above and below the signal source 16 are symmetric. The signal source 16 of the present invention input a periodic signal to the first impedance 12 and the second impedance 13. The periodic signal can be, for example, sine wave, square wave, triangle wave, etc. Alternatively, the signal source 16 of the present invention can also input a non-periodic signal or even a noise signal to the first impedance 12 and the second impedance 13, and the differentially amplified output signal is also close to zero.

In this embodiment, the capacitance value of the first capacitor 14 is close to, or even equal to, the capacitance value of the first parasitic capacitance 31 and second parasitic capacitance 32 connected in parallel. When a finger, conductor or object approaches or contacts the sensing electrode 15, the value of the second parasitic capacitance 32 of the sensing electrode 15 is changed, and thus the divided voltage and phase resulted on the input end 112 of the differential amplifier are changed, so that the voltages on the first input end 111 and on the second input end 112 are different from each other. Such a phenomenon is analogous to out of balance of a balance in which the balance is inclined toward the heavy end. Therefore, after the differential amplification of the differential amplifier 11, the output end 113 thereof outputs the amplified touch signal. By measuring the output variation of the differential amplifier 11, it is able to distinguish the minute parasitic capacitance variation generated by the sensing electrode 15.

Figure 9:
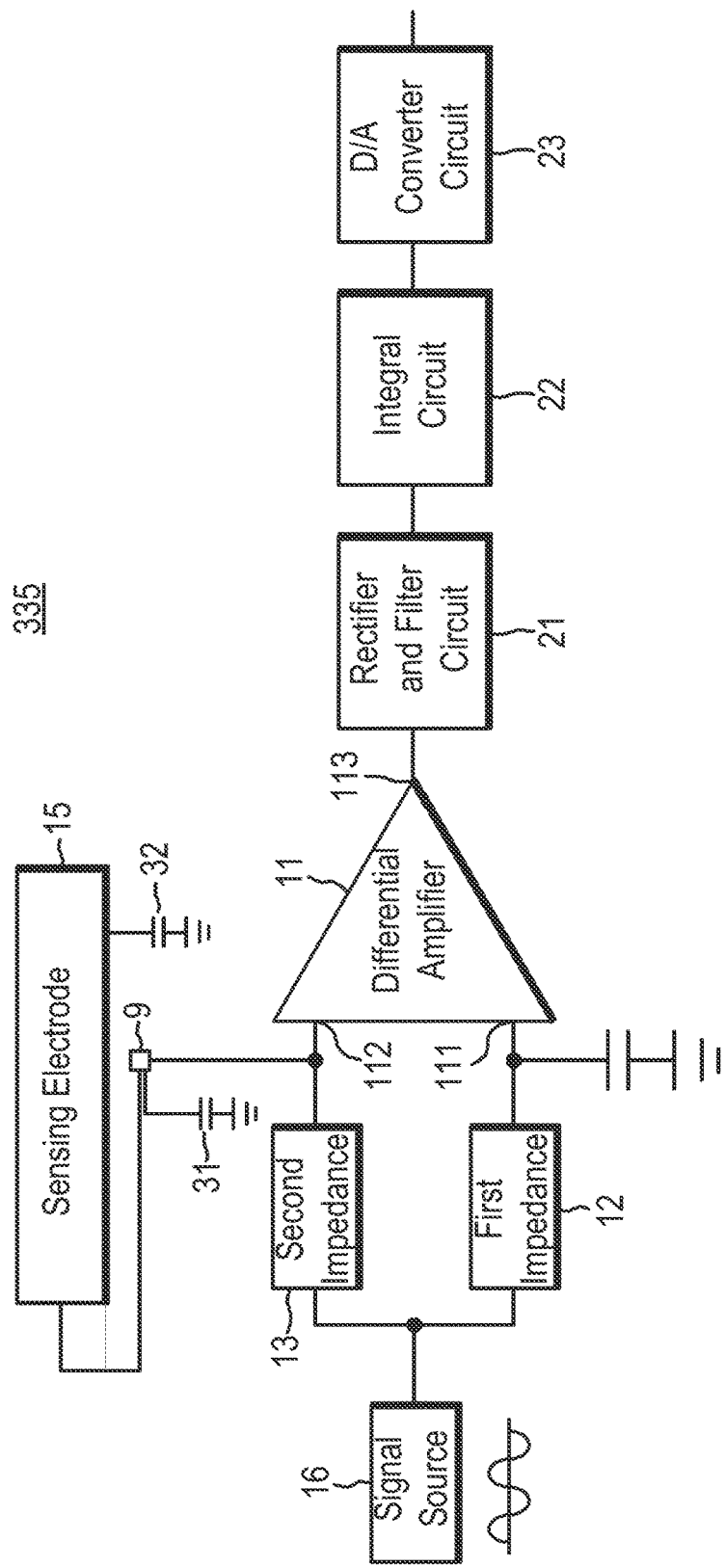
FIG. 9 is a configuration of a first output circuit of FIG. 8 according to the present invention.
Figure 10:
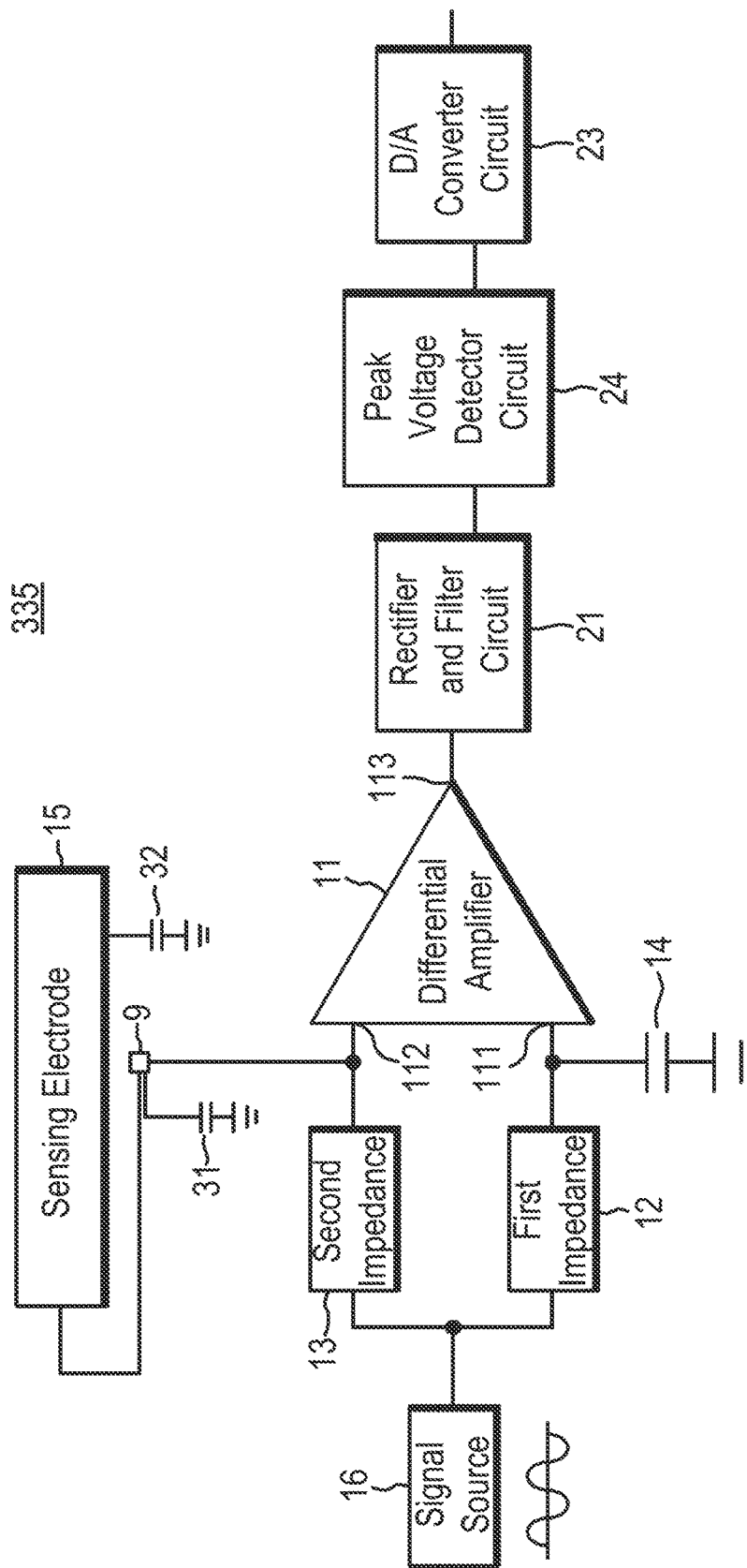
FIG. 10 is a configuration of a second output circuit of FIG. 8 according to the present invention.

Determination of the amplified output signal can be achieved by further connecting an output circuit to the output end 113. As shown in FIG. 9, the detector further includes a rectifier and filter circuit 21, an integral circuit 22, and an A/D converter circuit 23 for processing the touch signal at the output end 113. Alternatively, another output circuit can be used to achieve the same purpose. As shown in FIG. 10, this output circuit includes a rectifier and filter circuit 21, a peak voltage detector circuit 24, and an A/D converter circuit 23, which also can process the touch signal at the output end 113, thereby distinguishing the minute parasitic capacitance variation generated by the sensing electrode 15.

Figure 11:
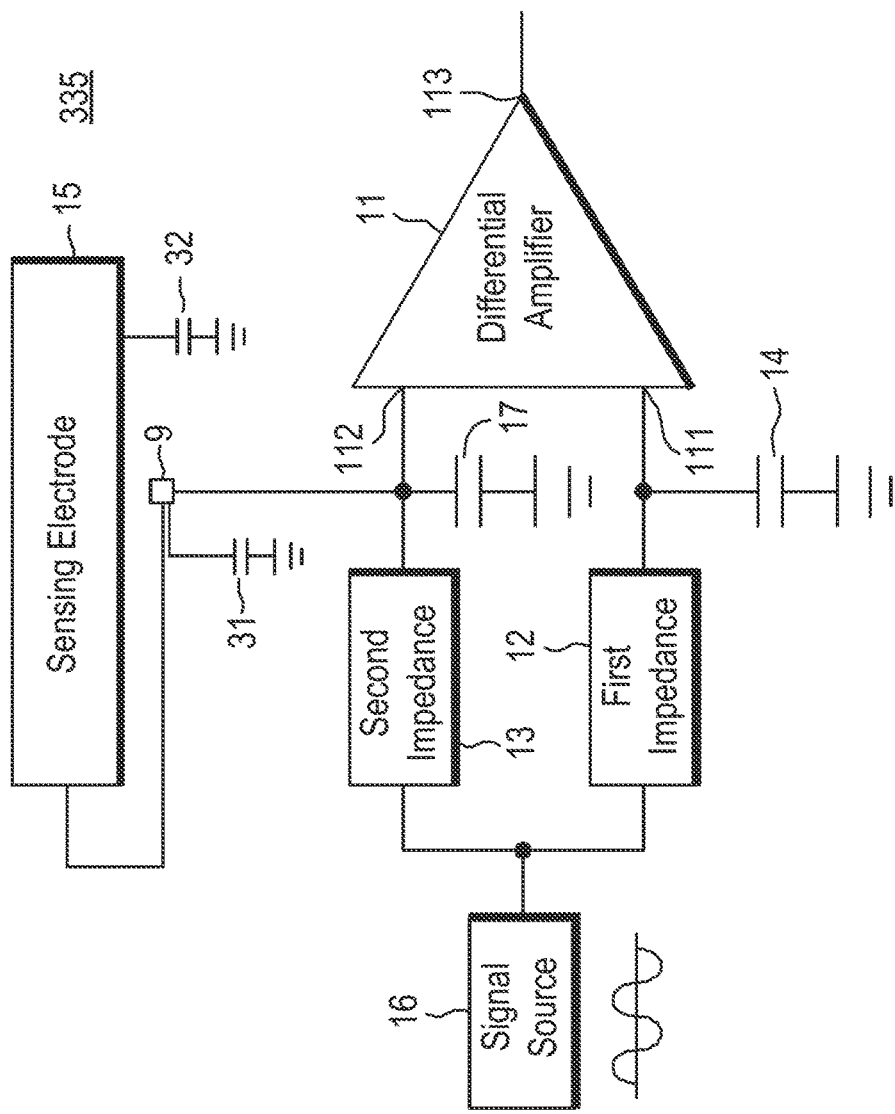
FIG. 11 is a system diagram of the detector in accordance with the present invention.

Then, with reference to FIG. 11, there is shown a system diagram of the detector in accordance with another example of the present invention. As shown in FIG. 11, the circuit diagram of this example is similar to that of FIG. 8, except that a second capacitor 17 is added. The capacitance value of the second capacitor 17, the first parasitic capacitance 31 and second parasitic capacitance 32 that are connected in parallel is close to, or even equal to, the capacitance value of the first capacitor 14. Therefore, the first input end 111 and the second input end 112 of the differential amplifier 11 are connected with capacitors of similar capacitance value.

Figure 12:
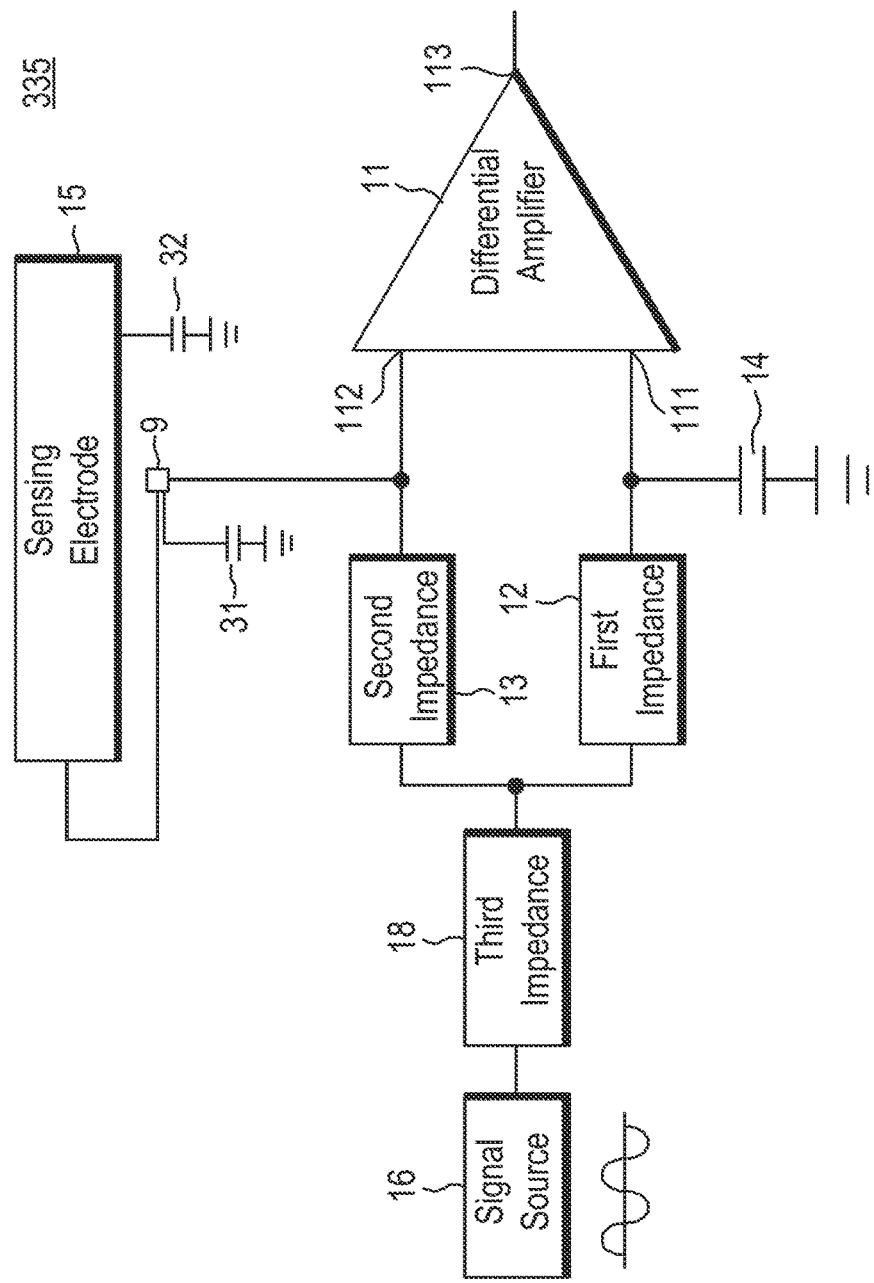
FIG. 12 is a system diagram of the minute impedance variation detection device in accordance with the present invention.

Moreover, with reference to FIG. 12, there is shown a system diagram of the minute impedance variation detection device in accordance with a further example of the present invention. As shown in FIG. 12, the circuit diagram of this example is similar to that of FIG. 7, except that a third impedance 18 is added. When voltages distributed on the first impedance 12 and second impedance 13 are not completely the same, the third impedance 18 can be used for adjustment for such a difference. Preferably, the third impedance 18 is a resistor.

Accordingly, with the detector 335 of the present invention, it is able to eliminate the interference caused by noises from circuit, power source, etc. In addition, the detector is able to measure very tiny variation, so as to provide a relatively high sensitivity.

As cited, it is known that, with the detector 335, the present invention is able to measure very tiny variation, so as to provide a relatively high sensitivity. Therefore, when the thickness of the transparent protection layer is increased, the fingerprint sensing can be accurately performed without using the expensive sapphire as the material of the transparent protection layer, so as to reduce the manufacturing cost. In addition, with the fingerprint sensor 333, the present invention is able to prevent the surrounding sensing electrodes from affecting the working sensing electrode, so that the control unit can accurately read the sensed signal on the working sensing electrode, thereby increasing the sensing accuracy. Furthermore, the traces also do not affect the sensed signals on the sensing electrodes, so that the size of the sensing electrodes can be reduced, and the sensing resolution can be increased.

Although the present invention has been explained in relation to its preferred embodiment, it is to be understood that many other possible modifications and variations can be made without departing from the spirit and scope of the invention as hereinafter claimed.

What is claimed is:

1. A mobile device with high-accuracy fingerprint identification, comprising:
    a display panel for displaying information associated with the mobile device;
    a transparent protection layer having one surface attached to the display panel for protecting the display panel; and
    a fingerprint identification device attached to the surface of the transparent protection layer for detecting a user fingerprint, the fingerprint identification device including:
    a flexible substrate;
    a fingerprint sensor disposed on one surface of the flexible substrate for sensing the user fingerprint so as to generate a fingerprint image; and
    a detector disposed on the surface of the flexible substrate and electrically connected to the fingerprint sensor for distinguishing a minute parasitic capacitance variation generated by the fingerprint sensor,
    wherein a part of the flexible substrate arranged with the fingerprint sensor is closely attached to the transparent protection layer, and a part of the flexible substrate arranged with the detector is separately attached to the transparent protection layer,
    wherein the detector is a minute impedance variation detection device,
    wherein the fingerprint sensor comprises:
        a plurality of sensing electrodes disposed on one surface of the substrate;
        a plurality of data readout selectors, each corresponding to a sensing electrode and having a first end, a second end, and a third end, wherein the first end is connected to the corresponding sensing electrode;
        a plurality of reference voltage selectors, each corresponding to at least one reference voltage selector and having a first end, a second end, and a third end, wherein the first end is connected to the corresponding sensing electrode;
        a plurality of data readout select traces, each connected to the second end of at least one corresponding data readout selector;
        a plurality of sensed signal readout lines, each connected to the third end of the at least one corresponding data readout selector;
        a plurality of reference voltage select traces, each connected to the second end of at least one corresponding reference voltage selector; and
        a control unit connected to the plurality of data readout selectors and the plurality of reference voltage selectors through the plurality of data readout select traces, the plurality of sensed signal readout lines, and the plurality of reference voltage select traces, so as to read a sensed signal of the sensing electrode corresponding to each data readout selector, and
    wherein the control unit divides the plurality of sensing electrodes into at least one sensing area and at least one non-sensing area by means of the plurality of data readout selectors and the plurality of reference voltage selectors.

2. The mobile device with high-accuracy fingerprint identification as claimed in claim 1, wherein the flexible substrate is made of polymer thin film.

3. The mobile device with high-accuracy fingerprint identification as claimed in claim 1, wherein the transparent protection layer is a protective glass.

4. The mobile device with high-accuracy fingerprint identification as claimed in claim 1, wherein each of the data readout selectors is a first thin film transistor, and each of the reference voltage selectors is a second thin film transistor.

5. The mobile device with high-accuracy fingerprint identification as claimed in claim 4, wherein the first thin film transistor has a gate corresponding to the second end of the data readout selector, a source/drain corresponding to the first end of the data readout selector, and a drain/source corresponding to the third end of the data readout selector.

6. The mobile device with high-accuracy fingerprint identification as claimed in claim 5, wherein the second thin film transistor has a gate corresponding to the second end of the reference voltage selector, a source/drain corresponding to the first end of the reference voltage selector, and a drain/source corresponding to the third end of the reference voltage selector.

7. The mobile device with high-accuracy fingerprint identification as claimed in claim 1, wherein the minute impedance variation detection device comprises:
   a differential amplifier including a first input end, a second input end and an output end;
   a first impedance electrically connected to the first input end;
   a second impedance electrically connected to the second input end;
   a first capacitor electrically connected to the first input end;
   at least one of the plurality of sensing electrodes electrically connected to the second input end for sensing a touch and thus receiving a touch signal;
   a signal source electrically connected to the first impedance and the second impedance for providing an input signal inputted to the first impedance and the second impedance, wherein the signal source provides a periodic signal for being inputted to the first impedance and the second impedance; and
   a second capacitor electrically connected to the second input end, wherein a capacitance value of the second capacitor, a first parasitic capacitor and a second parasitic capacitor connected in parallel is close to the capacitance value of the first capacitor,
   wherein the first impedance has an impedance value close to that of the second impedance, and the differential amplifier is based on the input signal and the sensing signal to amplify differentially the finger image signal and output the differentially amplified finger image signal to the output end.

8. The mobile device with high-accuracy fingerprint identification as claimed in claim 7, wherein the sensing electrode is electrically connected to the second input end via an integrated circuit pin having a capacitance value of the first parasitic capacitor, the sensing electrode has a capacitance value of the second parasitic capacitor, and the first capacitor has a capacitance value close to that of the first parasitic capacitor and second parasitic capacitor connected in parallel.

9. The mobile device with high-accuracy fingerprint identification as claimed in claim 8, wherein the minute impedance variation detection device further comprises a third impedance connected to the signal source and between the first and the second impedances.

10. The mobile device with high-accuracy fingerprint identification as claimed in claim 7, wherein the minute impedance variation detection device further comprises a rectifier and filter circuit, an integral circuit and an A/D converter circuit, the rectifier and filter circuit being electrically connected to the output end of the differential amplifier, the integral circuit being electrically connected to rectifier and filter circuit, the A/D converter circuit being electrically connected to the integral circuit.

* * * * *